United States Patent Office 3,320,726
Patented May 23, 1967

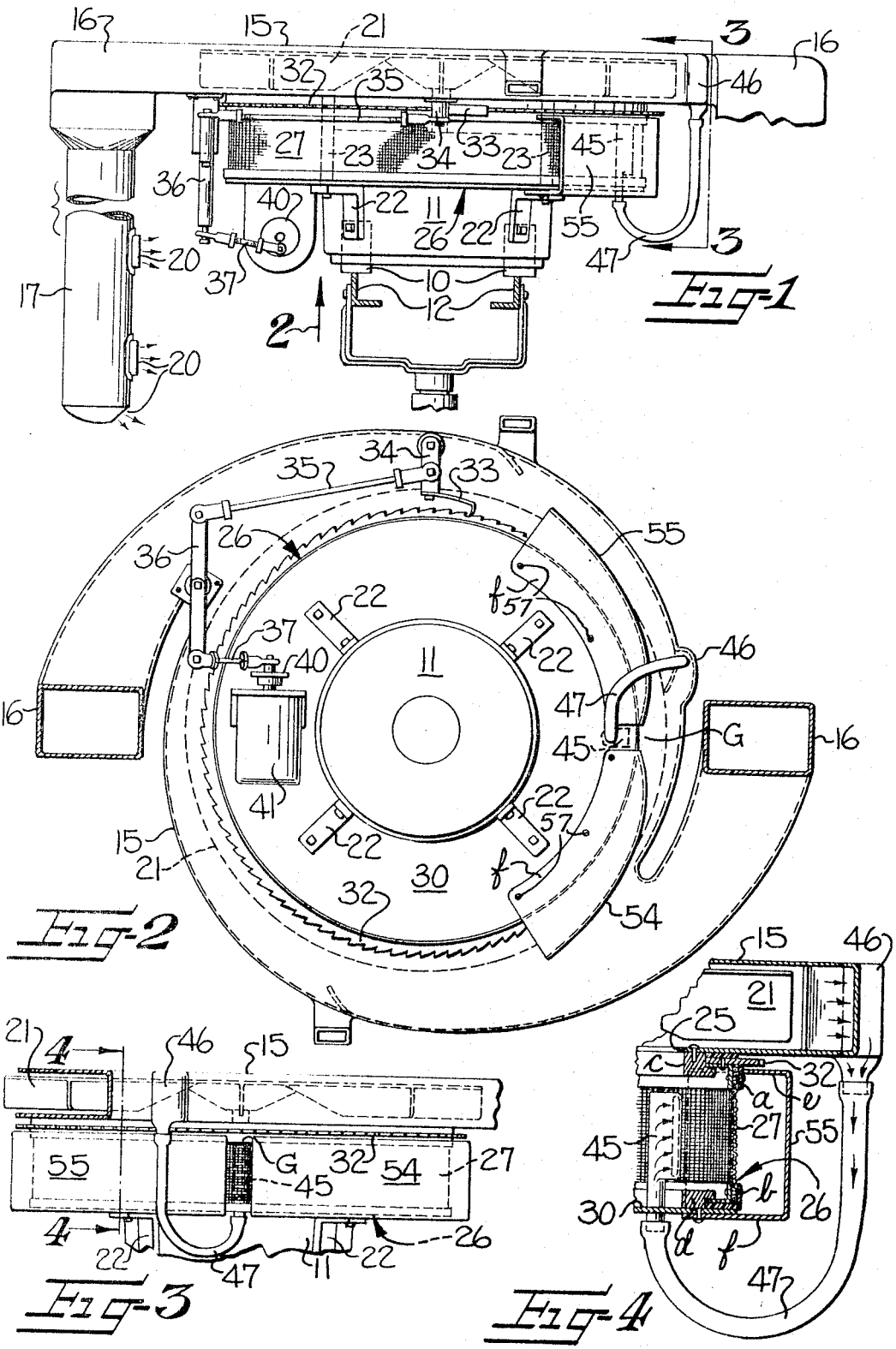

3,320,726
TRAVELING TEXTILE CLEANER WITH FORCED AIR FILTER CLEANING MEANS
Robert L. Black, Jr., Charlotte, N.C., assignor to Parks-Cramer Company, Fitchburg, Mass., a corporation of Massachusetts
Filed Apr. 18, 1966, Ser. No. 543,197
1 Claim. (Cl. 55—294)

This application is a continuation-in-part of my co-pending application Ser. No. 206,940 filed July 2, 1962 and entitled, Traveling Textile Cleaning Apparatus With Filter Cleaning Means, now Patent No. 3,251,175, dated May 17, 1966.

The said copending application discloses and claims a pneumatic traveling cleaner supported on a track extending over textile machines arranged in rows for movement over the machines and provided with a screen filter for filtering ambient lint and the like from air entering the inlet of a fan housing thereof as a blower fan in the housing causes blowing air streams to flow through duct means toward the textile machines. In order to keep the filter clean, the traveling cleaner of said copending application has a suction nozzle adjacent the outer surface of the filter and a blowing nozzle adjacent the inner surface of the filter in juxtaposed relation to the suction nozzle, with means causing a blowing air stream to flow from the blowing nozzle through the filter to the suction nozzle, during which relative movement is effected between the filter and the blowing and suction nozzles.

The principle of filter cleaning as applied in said copending application is, to my knowledge, the most efficient technique adaptable to pneumatic traveling cleaners today. However, there are instances in which it may be structurally or economically impractical to utilize suction for removing lint and the like from the outer surface of the filter of a traveling cleaner.

It is therefore an object of this invention to provide a pneumatic traveling cleaning apparatus of the type described with means for producing only a blowing air stream or streams adjacent the inner surface of a filter at the air inlet of the traveling cleaner blower for continuously blowing lint and the like off the outer surface of the filter.

More specifically, the invention includes a blowing nozzle traveling with the traveling cleaner, positioned adjacent the inner surface of the aforementioned filter and communicatively connected to the air outlet of the blower for directing a localized air stream outwardly from the blowing nozzle through the filter to dislodge accumulated lint or the like from the outer surface of the filter, during which relative movement is effected between the filter and the blowing nozzle to effect cleaning of substantially all the filter. Additionally, shielding means substantially close portions of the filter adjacent the blowing nozzle leaving a gap or opening registering with the nozzle through which the air stream flows to clean the filter. The shielding means serves to minimize the tendency for the lint blown off the filter by the blowing air stream to be drawn back against the filter under impetus of the flow of air into the blower inlet.

Some of the objects of the invention having been stated, other objects will appear as the description proceeds when taken in connection with the accompanying drawings, in which:

FIGURE 1 is an end elevation showing a preferred embodiment of the traveling blowing cleaner of the present invention, somewhat schematically, arranged to travel over rows of textile machines and showing the preferred arrangement of the filter-cleaning blowing nozzle in association therewith;

FIGURE 2 is an inverted plan view of the traveling cleaner, partially in section looking upwardly in the direction of the arrow 2 of FIGURE 1;

FIGURE 3 is a fragmentary vertical sectional view taken substantially along line 3—3 in FIGURE 1;

FIGURE 4 is a fragmentary vertical sectional view taken substantially along line 4—4 in FIGURE 3.

Referring more specifically to the drawings, and to FIGURE 1 in particular, the pneumatic traveling cleaner includes a motor driven wheeled carriage 10 having an electric motor 11 mounted thereon and which is propelled along or upon an elongate overhead trackway 12 extending above and longitudinally of a row or rows of textile machines, such as spinning frames, looms or the like. The traveling cleaner also includes a hollow blower housing or fan housing 15 of volute form in plan (FIGURE 2) having a pair of outwardly extending substantially laterally opposed ducts 16 connected to the air outlet of housing 15 and whose ends extend downwardly and have the upper ends of respective blowing tubes 17 connected thereto. Tubes 17 are provided with air discharge nozzles or portions 20 for directing air streams to and blowing lint and the like off of various parts of the textile machines over which track 12 extends. A motor driven rotary air impeller or blower fan 21 is mounted on the upper end of the shaft of electric motor 11 and positioned within housing 15.

In order to support housing 15 on motor 11, the motor is provided with a plurality of angle brackets 22, each of which has a post 23 fixed thereon and projecting upwardly therefrom. The upper end of each post 23 is suitably secured to the lower wall of blowing housing 15. Motor 11 constitutes means for propelling the cleaner along trackway 12 to cause the cleaning functions to be performed automatically and repeatedly at predetermined intervals. Of course, the traveling cleaner may be supported and propelled along track 12 by any suitable mechanism well known in the art such as, for example, that shown in Hodge et al. Patent No. 2,011,763. Accordingly, a further description of means for supporting and propelling the traveling cleaner along track 12 is deemed unnecessary.

The problem of small particles of fiber waste or lint constantly being generated by the operation of textile machines is one requiring special cleaning techniques which are quite different from the techniques involved in other types of cleaning. It is highly desirable, in cleaning by the use of traveling blowing air streams, that the air be as clean as practicable so that the traveling blowing air streams emitted from the nozzles 20 be free of lint so as not to blow lint and other foreign matter onto the textile machines or into the textile products being processed by the machines.

Accordingly, the instant invention provides a solution to the difficult problem of filtering the incoming air in a traveling textile cleaner by maintaining the filter in a clean condition to prevent clogging up the filter which otherwise would result in reducing the air flow and cleaning effectiveness.

The present invention includes filtering means for the air inlet 25 of the fan housing 15 for filtering ambient lint and the like from air entering the inlet, with blowing nozzle means directing a blowing air stream adjacent the inner surface of and outwardly through the filtering means for keeping the filtering means clean and substantially preventing excessive accumulation of ambient lint and the like on the outer surface of the filtering means.

In the instant embodiment of the invention, it will be observed in FIGURE 4 that the air inlet 25 is in the form of a substantially circular opening through the bottom wall of blower or fan housing 15. Circular air inlet opening 25 may be of substantially greater diameter than fan motor 11 and communicates with a filter assembly or housing broadly designated at 26. Filter housing 26 comprises an annular screen or filter 27 which may turn about an axis substantially corresponding to the substantially vertical axis of rotary air impeller 21. To this end, the upper and lower ends of filter 27 are suitably secured to annular frame members a, b (FIGURE 4), which may be shaped in the manner of angle bars in cross section, and whose inwardly projecting flanges engage the flanges of respective annular retaining rings c, d. Retaining ring c is suitably secured to the bottom wall of blower housing 15 adjacent air inlet opening 25. Retaining ring d is suitably secured to the upper surface of a bottom plate 30 which encircles motor 11 and is suitably secured to brackets 22. Bottom plate 30 and retaining rings c, d remain stationary with respect to blower housing 15 as the respective annular frame members b, a rotate in engagement therewith by means to be presently described. The upper annular frame member a of filter 27 has an annular ratchet wheel 32 suitably secured thereto which is engaged by a pawl 33 (FIGURES 1 and 2) in the form of a leaf spring member inherently biased inwardly toward ratchet wheel 32 and fixed to a pivoted pawl-carrying arm 34. Pawl-carrying arm 34 is connected, by suitable linkage 35, 36, 37, to an eccentric 40 which may be driven by an electric motor 41 suitably secured and depending from bottom plate 30 of filter housing 26. It is thus seen that pawl 33 may be oscillated continuously during operation of the traveling cleaner so as to impart automatically stepwise rotation movement to filter 27 relative to filter housing 26 and blower housing 15 during travel of the cleaner.

During stepwise rotation of filter 27, it moves past the air discharge orifice of a filter-cleaning blowing nozzle 45 positioned closely adjacent the inner surface of filter 27 and being suitably supported by plate 30. Blowing nozzle 45 may extend downwardly through plate 30 and is connected to a small air outlet portion 46 on the exhaust side of fan housing 15 by means of a conduit 47.

Since substantially all air drawn into blower housing 15 by fan 21 is filtered through filter 27, it is apparent that ambient lint and other light material tends to collect on the outer surface of filter 27. However, blowing nozzle 45 is so positioned that it exhausts a localized blowing air stream extending from the upper to the lower exposed portions of filter 27, which localized blowing air stream is exhausted through filter 27 to dislodge and blow any lint in front of the nozzle 45 off the outer surface of filter 27 as successive portions thereof move past nozzle 45.

Since the efficiency of blowing nozzle 45 in effecting the removal of lint and the like from the outer surface of filter 27 is determined by the velocity of the air stream emanating from nozzle 45, and also since it is desirable to utilize the exhaust side of blower housing 15 as the source of the air stream for filter-cleaning nozzle 45, it is desirable to provide substantially impervious shielding means for portions of filter adjacent opposite sides of nozzle 45 to render the inward flow of air through filter 27 ineffective to immediately draw back against the filter that lint and the like which is being blown off the filter by the air stream emanating from nozzle 45. Although it is contemplated that such shielding means may be provided adjacent the inner surface of filter 27, it is preferred that such shielding means is provided exteriorly of filter 27 in order that it may flare outwardly or diverge away from points adjacent each side of the flow of the filter-cleaning air stream from blowing nozzle 45.

Accordingly, the proximal edges of a pair of arcuate or curved shield members 54, 55 are positioned very closely adjacent their outer surface of filter 27 and closely adjacent the orifice or filter cleaning blowing nozzle 45, with a gap G being defined therebetween through which passes the localized blowing air stream issuing from nozzle 45 and lint dislodged thereby from filter 27. As best shown in FIGURE 2, it will be observed that the substantially vertical outer surfaces of shield members 54, 55 curved outwardly away from filter 27 in substantial diverging relationship with respect to each other and with their distal ends terminating substantial distances from gap G. Further, the distal ends of the substantially vertical surfaces of shield members 54, 55 are preferably spaced substantial distances outwardly from anular filter 27 so as to minimize the tendency for any lint blow off the filter 27 by the air stream issuing from blowing nozzle 45 to be sucked back onto the outer surface of filter 27 by the flow of air into the inlet of housing 15 induced by fan 21.

Shield members 54, 55 may be supported in fixed relation to blower housing 15 by any suitable means. As shown, each shield member is substantially channel-shaped in cross section, is made of relatively thin material such as sheet metal, and is provided with radially inwardly projecting upper and lower flanges e, f which serve to substantially close the space defined between each shield member 54, 55 at the upper and lower edges thereof and the outer surface of filter 27. In this instance, the inner edge of upper flange e of each shield member 54, 55 terminates in close proximity to butt out of touching engagement with filter 27, and each lower flange f extends inwardly beneath plate 30 and is suitably secured thereto, as by screws 57 (FIGURE 2). In the particular illustrated embodiment, it will be noted that, although shield members 54, 55 extend over substantial portions of filter 27, approximately 60%–75% or more of the filter 27 may be entirely exposed to the ambient air and any lint or fly borne thereby. In addition, since the distal ends of shield members 54, 55 are open between the upper and lower flanges e, f thereof, it is apparent that air may also be drawn through the portions of filter which may be disposed within the radial planes of shield members 54, 55.

From the foregoing description, it is apparent that any lint and the like which is blown off the outer surface of filter 27 through gap G by the air stream issuing from filter-cleaning blowing nozzle 45 is substantially prevented from being drawn back against the outer surface of the filter, since shield members 54, 55 substantially reduce or eliminate the suction effect produced by fan 21 at areas adjacent opposite sides of the gap G. Thus, the filter is maintained substantially free of lint throughout the same during operation of the traveling cleaner.

In the drawing and specification there has been set forth a preferred embodiment of the invention, and although specific terms are employed, they are used in a generic and descriptive sense only and not for purposes of limitation, the scope of the invention being defined in the claim.

I claim:

In a pneumatic traveling cleaner having a blower fan housing adapted for travel along a track above textile machines, said housing having an air inlet and an air outlet, a driven blower fan in said housing, and duct means connected to the outlet of said housing for directing blowing air streams toward the machines above which the housing travels for blowing lint and the like from such machines; the combination therewith of an annular rotary screen filter associated with the air inlet of said housing for filtering ambient lint and the like from air entering said air inlet, a blowing nozzle positioned within, and adjacent the inner surface of, said filter for blowing an air stream outwardly through the filter, means for imparting rotary movement to said filter during travel of the housing along said track, stationary shielding means substantially closing substantial portions of but substantially less than all of said filter, said shielding means comprising a pair of impervious arcuate shield members positioned closely adjacent the outer surface of said filter and defining a gap therebetween open to the atmosphere and aligned with said blowing nozzle and through which the air stream from said blowing nozzle flows, said shield members being flared outwardly in diverging relationship from the proximal ends thereof and away from said filter and also being of such length as to substantially prevent lint and the like blown off said filter by the air stream from said blowing nozzle from being immediately drawn back against said filter by air entering the air inlet of said housing, said shield members also being provided with upper and lower walls so the shield members are substantially channel-shaped in cross section, and said upper and lower walls projecting inwardly from said shield members and terminating in close proximity to said filter so air may flow inwardly between each shield member and said filter to permit air to flow inwardly through said filter in the radial planes of said shield members.

References Cited by the Examiner

UNITED STATES PATENTS

| | | | |
|---|---|---|---|
| 2,474,478 | 6/1949 | Hart | 55—290 |
| 2,752,003 | 6/1956 | Hersey et al. | 55—290 |
| 2,823,656 | 2/1958 | Dolza | 55—302 X |
| 3,251,175 | 5/1966 | Black | 55—294 |

HARRY E. THORNTON, *Primary Examiner.*

ROBERT F. BURNETT, S. W. SOKOLOFF,
*Assistant Examiners.*